United States Patent [19]

Munk

[11] 4,305,969
[45] Dec. 15, 1981

[54] DRY CHIP-LIKE DISCS OF PROVISIONS OR FINE FOODS AND PROCESS FOR THEIR PRODUCTION

[76] Inventor: Werner G. Munk, Bergstr. 12, D-7981 Vogt/Ravensburg, Fed. Rep. of Germany

[21] Appl. No.: 77,822

[22] Filed: Sep. 21, 1979

[30] Foreign Application Priority Data

Sep. 21, 1978 [DE] Fed. Rep. of Germany ....... 2841067

[51] Int. Cl.$^3$ .......................... A23C 9/16; A23C 9/10; A23C 9/12
[52] U.S. Cl. .................................. 426/580; 426/583; 426/384; 426/385; 426/444; 426/515
[58] Field of Search ............... 426/444, 456, 457, 464, 426/465, 470, 473, 564, 512, 513, 515, 516, 517, 810, 560, 384, 385, 285, 453, 588, 580

[56] References Cited

U.S. PATENT DOCUMENTS

| | | | |
|---|---|---|---|
| 1,233,446 | 7/1917 | Campbell | 426/588 |
| 1,689,357 | 10/1928 | Merrell | 426/588 |
| 2,650,881 | 9/1953 | Forkner | 426/444 |
| 3,259,508 | 7/1966 | Aquirre et al. | 426/473 |
| 3,431,119 | 3/1969 | Griffon | 426/464 |
| 3,451,822 | 6/1969 | Fast et al. | 426/464 |
| 3,512,993 | 5/1970 | Conley et al. | 426/658 |
| 3,615,724 | 10/1971 | Sech | 426/473 |
| 3,620,760 | 11/1971 | Ver Steeg | 426/473 |
| 3,698,914 | 10/1972 | Kortschot et al. | 426/473 |
| 3,892,867 | 7/1975 | Schoonman | 426/285 |
| 3,969,539 | 7/1976 | Sumner | 426/473 |
| 3,998,977 | 12/1976 | Rabeler | 426/473 |

*Primary Examiner*—Jeanette M. Hunter
*Attorney, Agent, or Firm*—Steele, Gould & Fried

[57] ABSTRACT

Dry chip-like discs of provisions or fine foods and a process for producing such discs. Raw food materials containing builder materials and soluble ingredients are converted into an essentially homogeneous pulp, and are brought into a composition which, as regards taste, is ready to be consumed. This pulp, having a consistency from flowable to pasty, is shaped into discs having a thickness of from 1 to 10 mm and is carefully dried, thereby substantially maintaining the builder structure and the thickness of the layer of the disc. The discs so produced are suitable for immediate consumption without previous mixing with liquids, and are converted back into a pulp by saliva in the mouth, the presence of the discs in the mouth stimulating the production of saliva.

10 Claims, No Drawings

DRY CHIP-LIKE DISCS OF PROVISIONS OR FINE FOODS AND PROCESS FOR THEIR PRODUCTION

BACKGROUND OF THE INVENTION

The invention relates to dry chip-like discs of provisions or fine foods which, due to their shape and consistency, are suitable for immediate consumption and to a process for producing the same.

Such food articles are particularly known in the form of dried discs of fruits and potato chips. However, it is a question of fruit types by which by their very nature make them suitable for producing chip-like products, because the fruit as such has the size and consistency necessary for producing chips.

It has also long been known in connection with foods to bring them into a storable state by drying. The type of drying process chosen is then dependent on the requirements made on the dried product. In addition to the need for optimum storage characteristics it must also be possible to further process the dried product in an optimum manner. The dried product in the form of powder, granules or fragments has not hitherto been intended or considered suitable for direct consumption and has instead been further processed in kitchens, factories or on a mass-produced scale. An important part of this further processing is the reconstitution of the dried product, i.e. the re-moistening process in order as far as possible to restore the sensory characteristics of the original fresh product or the product prepared by the drying process. Due to careful drying the reconstituted product can be given a taste like the original fresh product or the prepared product. However, it has been hitherto impossible to produce the dried product in a form and consistency considered pleasant for immediate consumption.

In addition to these products made durable by drying there are a large number of foodstuffs made largely durable by a baking process. Products of this type are also known in disc form. However, the baking process is irreversible, so that a reconstitution, i.e. the restoration of the state of the foodstuff before the baking process is no longer possible.

BRIEF SUMMARY OF THE INVENTION

The object of the present invention is to produce discs made from provisions or fine foods from a plurality of raw materials, which are suitable for immediate consumption and where reconstitution is not necessary before consumption.

According to the invention this problem is solved by dry chip-like discs of provisions or fine foods, having a thickness of 1 to 10 mm and comprising a substantially homogeneous basic substance which is ready to eat and can be reconstituted in the mouth and which contains water-soluble and insoluble ingredients, whilst being present in the form of a solid porous structure into which larger fragments may be incorporated.

The chip products according to the invention are eminently suitable for immediate consumption due to their external shape, their crisp and crackling consistency resulting from drying, their porous structure and their composition formulated so as to give a fine taste. Reconstitution takes place in the mouth by the saliva in the form of a pleasant melting or dissolving process.

Thus, the invention eliminates the problem of reconstituting products which are identical to the natural products or have a corresponding consistency. In principle there is no need for further processing of the dried products before consumption. The actual consumer reconstitutes the product during eating, production of saliva in the mouth being started by the planned physical and chemical composition of the food discs. During the reconstitution of the food discs the saliva leads to the original brittle consistency being changed into a soft, swallowable consistency, which is felt by the consumer as a pleasant melting with increasing taste. The water-soluble substances in the food discs particularly encourage saliva production, preventing the product from becoming tacky or solid in the mouth.

The raw materials for the basic substance are essentially pulps or concentrates of fruit and vegetables, milk, milk products and their concentrates, as well as yoghurt, curds, fish and meat and products produced from them as well as semi-finished products for producing foodstuffs, e.g. fried sausages. Ingredients of the basic substance or additives thereto can be flavouring agents and the like such as cocoa, coffee, vanilla, etc. As a function of the desired recipe the basic substance can contain these ingredients either alone or in the form of mixtures.

The desired crispness and/or crunchiness of the food discs according to the invention is largely dependent on the degree of drying which, as a function of the composition of the basic substance, should be as low as possible and in general below 10%, preferably below 5% moisture content. However, with regard to the crispness an important part is played by the thickness of the food discs. When the discs are approximately 1 to 3 mm thick they are particularly crunchy, whereas thicker discs of approximately 3 to 8 mm have a somewhat softer character in the nature of a so-called soft product when reconstituted in the mouth. The soft product essentially has the quantity by weight of the basic substance per unit of area contained in the crunchy product, but due to additional macropores or cavities has a lower density and therefore a greater thickness. Generally the discs are less than 10 mm thick and preferably less than 5 mm thick. For strength reasons there is generally no drop below 1 mm.

The food discs according to the invention are preferably produced by preparing an aqueous basic substance of food raw materials containing water-soluble and water-insoluble builder substances, optionally accompanied by the addition of flavouring agents and spices in accordance with a composition which is ready for consumption and is brought into a still flowable, viscous to plastically shapable consistency, follow by shaping into discs with a thickness of 1 to 10 mm and careful drying accompanied by the formation of a porous dried product. For careful drying it is essential that the basic substance undergoes no changes with regard to its composition and taste due to the drying process, i.e. ensuring that complete reconstitution is possible due to moistening with water or saliva. Therefore the preferred drying process is dry under subatmospheric pressure, particularly freeze-drying. During freeze-drying the discs formed from the basic substance are preferably deep frozen in a fluidized bed and then freeze-dried.

The shaping of the basic substance into discs can be realized by pouring it into moulds or by spreading it or by bringing it into a plastically deformable consistency and then cutting. The latter can be brought about by bringing the basic substance into a plastically deformable and cuttable consistency by prechilling or by adding hardening agents, followed by pressing into a strand corresponding to the cross-section of the desired disc size and then cutting into discs.

It is important for the desired consumption characteristics of the food discs according to the invention that during consumption the discs absorb the saliva to the desired extent and rapidly disintegrate. This is achieved by a high proportion of substances which are soluble in water and/or saliva such as sugar, mineral salts, fruit acids and the like, which encourage saliva production and lead to a disintegration of the structure of the discs, but which due to their binder characteristics also act as builder substances. However, an important part is also played by the porosity of the product, which ensures that the discs are rapidly penetrated by saliva. In freeze-drying this porosity occurs on removing the ice crystals from the pre-frozen basic substance. However, pore formation can also be aided by whipping or foaming up the basic substance before the drying process, particularly when producing a soft product. In addition, the water-insoluble substances, particularly builder and fibrous materials of vegetable and animal products contribute to the formation of the porous structure of the food discs, because they prevent any collapse or caking of the basic substance during careful drying. Therefore the completely dried food discs essentially have the same thickness and size as the pre-shaped discs or sheets of the still moist basic substance. Generally the disc diameter is 20 to 60 mm, so that it can be placed all at once in the mouth. However, larger and smaller sizes are also possible, as well as non-circular flat members, such as plates, strips and the like.

The quantity of water in the basic substance depends on the one hand on the desired consistency and/or viscosity of the basic substance before drying. However, on the other hand a high water content is generally desired for forming a large volume of the pores. Therefore the water content in the basic substance before drying is generally at least 50% and preferably approximately 60 to 90%. It can even exceed 90%.

As stated hereinbefore the basic substance can be composed of a plurality of food raw materials. However, particular preference is given to a basic substance based on milk or milk products, because they represent a readily obtainable, nutritionally valuable and protein-containing starting substance. However, basic substances based on milk products can be given the most varied taste directions by additives such as fruit, vegetables, herbs, meat and the like.

Hereinafter the process of the invention is described in a non-limitative manner in connection with the production of food discs.

A homogeneous basic mass is prepared from the individual food raw materials of the above-defined type or mixtures thereof. If desired for the purpose of modifying the taste or for regulating saliva production it is possible to add foods or additives, such an animal or vegetable fats, protein, starch, gelatin and other hydrocolloids, as well as sugar, food acids, salt spices or flavours, the nature and number of the additives being essentially dependent on the desired food recipe. It is important that the basic substance contains a high content of soluble substances which will subsequently encourage saliva production. To improve the consistency, both for the processing of the basic substance and also for the final state, particularly the porosity of the food discs, emulsifiers, thickeners, stabilisers and/or whipping or suspending agents can be added. The flavour and appearance of the dried food discs can also be improved by adding individual components of the basic substance, particularly fruits in the forms of small fragments.

The selection of the individual additives for the basic substance is dependent not only on the desired taste direction, but also on the desired strength and structure of the food discs. The nature and quantity of the ingredients are matched to one another in such a way that during eating they only disintegrate when they have absorbed a corresponding quantity of saliva. This can be achieved particularly by controlling the porosity and by varying the content of soluble and swellable substances. Thus, in the case of food discs based on milk and milk products preference is given to additives of soluble substances such as sugar and thickening or swelling agents such as modified starch in order to obtain the necessary strength. The porosity can be varied by the ratio of soluble to insoluble ingredients and also by the nature of the drying process. If the basic substance is given a foam structure before drying, then in addition to the fine open pore structure there is a coarse porosity due to the foam formation. Thus, visible cavities can form in the product, interconnected by micropores.

Other preparation stages of the basic substance before drying can be a heat treatment, e.g. for the purpose of sterilization, concentration, homogenisation, incubation or fermentation and/or maturing, depending on the raw materials and the end products involved. As careful drying makes it possible to keep the ingredients of the basic substance in their natural state the content of ferments and vitamins obtained by incubation or fermentation with physiologically desired bacteria, such as yoghurt bacteria is not impaired by the subsequent drying and the maintaining of the dry state in the finished product. Production of the basic substance can be followed by a pre-chilling thereof for which a whisking apparatus conventionally used in the ice-cream or confectionery industry can be employed. During prechilling the basic substance is preferably vigorously agitated and, if desired, it can be whipped with air or nitrogen to increase the porosity during the cooling process. However, a desired porosity can also be produced by fermentation of the basic substance linked with gas formation.

During drying, which is preferably freeze-drying, dehydration takes place whilst retaining the external shape of the food discs. Depending on the pretreatment of the basic substance the discs are given the predetermined porosity and consistency which appears to be most suitable for direct consumption. In addition to freeze-drying it is also possible to use other careful drying processes which do not impair the reconstitutability of the product when placed in the mouth. After drying the food discs are packed, whereby when packing sensitive and hygroscopic products packing is preferably water vapour-tight. It is also possible to pack under a protective gas atmosphere.

As a result of the invention numerous basis foodstuffs and mixtures selected in an appropriate manner can be brought into a form suitable for direct consumption, without their nutritional value being lost. The food discs according to the invention can be kept for a long period, in many cases even in the same way as a preserved food. Thus, it is possible to bring the basic foodstuff milk into a crisp and crunchy form without the nutritional value suffering significantly. No preservatives or undesired additives have to be used. In the form of such milk chips milk can again acquire considerable significance as a food in schools.

By means of the process according to the invention it is also possible to produce combined protein structures of vegetable or animal products as food discs, in order e.g. to provide geriatric patients with food having a high protein content, which can be easily consumed. Finally a crisp and crunchy food disc of boiled meat can be consumed more easily than the actual boiled meat, particularly by elderly people where chewing is a problem.

It is also possible to produce emergency or picnic foods with a composition adapted to the intended use. Of particular advantage are the long storage stability, the ease of transportation and the pleasant eating characteristics, without any preparation being necessary.

Instead of using an extrusion process the basic substance can be shaped prior to drying by any other per se known process, e.g. by solidifying in moulds having an appropriate cross-section, which need not be circular. It is important that the discs are sufficiently thin, so that reconstitution in the mouth is still possible. As the process of the invention starts with a paste-like basic substance on reconstitution in the mouth such a paste-like substance is again formed which dissolves in the mouth as in a melting process due to saliva formation.

Further details and advantages of the invention can be gathered from the following description of examples, the recipes and desired processing methods being interchangeable in each case.

EXAMPLE 1

Milk chips by means of extrusion

The basic substance is formulated as follows:

| | |
|---|---|
| Whole milk concentrate approx. 24% DS | 83% |
| Saccharose | 9% |
| Glucose syrup approx. 65% DS | 6% |
| Whipping and thickening agent | 1.5% |
| Flavours | 0.5% |
| | 100% |

Pasteurized whole milk is evaporated to 24% DS (dry substance), is provided with the additives according to the recipe, followed by mixing, heat treatment and cooling. As an alternative to evaporation the basic substance can also be produced by using pasteurized whole milk and adding cream and milk powder.

The basic substance formed in this way having a water content of approximately 66% is cooled to the temperature range $-3°$ to $-10°$ C. by means of a freezer (apparatus conventionally used in ice-cream manufacture) accompanied by stirring and is whipped up to 100 to 150% by supplying air.

The deep-frozen, whipped and still flowable basic substance is fed to an extruder. The basic substance leaves the extruder as a cutable strand. By means of a cutting mechanism the strand is cut into discs. The shape of the food disc is precisely determined by the extruder outlet opening and by the disc thickness (diameter 40 to 50 mm, thickness 4 to 5 mm).

Immediately following the cutting process the discs fall onto a conveyor belt, which conveys them into a deep-freezing chamber where they are frozen to temperatures of $-15°$ to $-30°$ C. At the end of the deep-freezing chamber the discs are removed from the belt and as a pourable product are either returned directly to the drying process or are fed into containers for intermediate storage at deep-frozen temperatures.

As a result of freeze-drying the food discs are given a porous, crunchy to soft consistency giving pleasant sensory properties when consumed.

The dry food discs are hygroscopic and are packed to a greater or lesser extent in water vapour-tight manner, depending on the desired keeping period.

EXAMPLE 2

Fruit yoghurt chips flow-shaping

The basic substance is formulated as follows:

| | |
|---|---|
| Whole milk concentrate approx. 16% DS | 63% |
| Saccharose | 5% |
| Modified starch as the thickener | 2% |
| Fruit preparation approx. 48% DS | 25% |
| Yoghurt culture | 5% |
| | 100% |

Pasteurized whole milk is evaporated and is provided with the additives in the recipe, with the exception of the fruit preparation and the yoghurt culture. After further heat treatment (pasteurization), accompanied by the addition of the culture, the milk concentrate is incubated to form a yoghurt, after which cooling takes place and the sterile fruit preparation is added.

The thus prepared, still flowable basic substance is supplied dropwise to a conveyor belt by means of a metering apparatus or is discontinuously sprayed on, after which it is spread out in disc-like manner. By means of the metering apparatus and the metered quantity the shape of the food disc is accurately determined as a function of the basic substance consistency (diameter 40 to 50 mm, thickness 2 to 3 mm).

The conveyor belt passes through a deep-freezing tunnel in which the discs take on a temperature of $-15°$ C. to $-30°$ C., the remainder of the procedure being as in example 1. The dried fruit yoghurt discs form a natural product containing live yoghurt bacteria. The finished chips have a density of approx. 0.6 to 0.7 g/cm$^3$.

EXAMPLE 3

Bran chips by means of freeze-forming

The basic substance has the following formulation:

| | |
|---|---|
| Whole milk concentrate approx. 16% DS | 77% |
| Saccharose | 3% |
| Dextrose | 3% |
| Modified starch as the thickener | 2% |
| Muesli/bran mixture | 10% |
| Yoghurt culture | 5% |
| | 100% |

The basic substance is prepared as in example 2 and it is fed to a crushed ice machine. Depending on the design especially shaped moulds are filled with the basic substance and deep-frozen. The deep-frozen basic substance in the form of food sheets or plates is removed from the moulds and as a pourable product is fed directly to the drying process or is intermediately stored in deep-freezing chambers.

As is shown by the examples the invention makes it possible to produce milk-based chips, so that a new use is found for milk. As milk does not itself contain sufficient builder substances adequate quantities thereof are added thereto, particularly in the form of sugars or monosaccharides and disaccharides, as well as swelling or thickening agents. There can be wide variations in the additive quantities. Generally approximately 4 to 20% by weight, preferably 6 to 12% by weight of sugars such as Dextrose, Saccharose and Lactose and 0 to 3% by weight, preferably 0.1 to 2% by weight of thickeners are added to the basic substance. The dried product can contain up to 60% by weight and more of sugars, including the Lactose from the milk. The sugar content is preferably approx. 20 to 40% by weight. The thickener content in the dried product can be up to 10% by weight and is generally 0.3 to 6% by weight, the content depending on the thickening force of the thickener. When using modified starch which has a relatively low thickening force the quantity is in the middle to upper range, whereas in the case of thickeners with a high thickening force the quantities can be kept lower.

It has surprisingly been found that the milk fat in the chips does not turn bad even during prolonged storage. Presumably the fat is enveloped by the builder substances. It is therefore possible to use high fat levels, i.e. to additionally add further fats, particularly vegetable fats.

The invention is not limited to the embodiments described and represented hereinbefore and various modifications can be made thereto without passing beyond the scope of the invention.

What is claimed is:

1. A process for producing dry milk or milk products discs suitable for immediate human consumption without prior reconstitution, comprising the steps of:
   forming an aqueous milk based slurry containing milk or a milk product, sugar, and at least about 50%, by weight, water,
   shaping said aqueous slurry, forming discs of a thickness of from about 1 to about 10 mm; and,
   freeze drying said discs to a moisture content below about 10%, by weight, based on the weight of the disc, whereby said discs acquire a crisp and crunchy form and can be reconstituted in the mouth by saliva.

2. The process of claim 1, wherein said dried discs have a diameter of from about 20 to about 60 mm and a thickness of from about 1 to about 3 mm.

3. The process of claim 1 wherein said aqueous slurry contains about 4 to about 20%, by weight, sugar and from about 0 to about 3%, by weight, starch thickening agent.

4. The process of claim 3 wherein said aqueous slurry contains flavor additives selected from the group consisting of fruits, vegetables, meats, salt, herbs, spices and flavors.

5. The process of claim 1 wherein said aqueous slurry contains from about 60% to about 90%, by weight, water.

6. The process of claim 1 wherein said aqueous slurry is vigorously agitated before freeze drying.

7. The product produced by the process of claim 1.

8. The product produced by the process of claim 1 wherein said aqueous slurry before freeze drying contains about 4 to about 20%, by weight, sugar, and from about 0 to about 3%, by weight, thickener, said percentages based on the weight of the discs.

9. The product produced by the process of claim 1 wherein said aqueous slurry before freeze drying contains additives selected from the group consisting of fruits, vegetables, meats, salt, herbs, spices and flavors.

10. The product produced by the process of claim 1 wherein said freeze dried slurry contains before freeze drying from about 60% to about 90%, by weight, water.

* * * * *